(12) United States Patent
Thandu

(10) Patent No.: US 6,597,921 B2
(45) Date of Patent: Jul. 22, 2003

(54) METHOD AND SYSTEM FOR PROTOCOL FEATURE COMMUNICATION

(75) Inventor: Balasubramaniam Kulasekaran Thandu, Cedar Park, TX (US)

(73) Assignee: SBC Properties, LP, Reno, NV (US)

(*) Notice: Subject to any disclaimer, the term of this patent is extended or adjusted under 35 U.S.C. 154(b) by 3 days.

(21) Appl. No.: 09/747,560

(22) Filed: Dec. 22, 2000

(65) Prior Publication Data

US 2002/0137534 A1 Sep. 26, 2002

(51) Int. Cl.[7] ............................. H04B 7/00; H04Q 7/20
(52) U.S. Cl. ..................... 455/517; 455/418; 455/419; 370/466; 370/467
(58) Field of Search ...................... 455/517, 419, 455/418, 403; 370/465, 466, 467, 463; 375/222

(56) References Cited

U.S. PATENT DOCUMENTS

| | | | |
|---|---|---|---|
| 5,301,223 A | * 4/1994 | Amadon et al. | ............. 379/58 |
| 5,483,531 A | * 1/1996 | Jouin et al. | ............. 370/79 |
| 5,488,693 A | * 1/1996 | Houck et al. | |
| 5,603,081 A | 2/1997 | Raith et al. | |
| 5,778,316 A | 7/1998 | Persson et al. | |
| 5,794,142 A | * 8/1998 | Vanttila et al. | ............. 455/419 |
| 5,857,153 A | 1/1999 | Lupien | |
| 5,864,762 A | 1/1999 | Childress et al. | |
| 5,924,026 A | 7/1999 | Krishnan | |
| 5,966,663 A | 10/1999 | Gleason | |
| 6,006,091 A | 12/1999 | Lupien | |
| 6,134,438 A | 10/2000 | Sawyer | |
| 6,223,028 B1 | * 4/2001 | Chang et al. | ............. 455/419 |
| 6,321,095 B1 | * 11/2001 | Gavette | ............. 455/517 |

* cited by examiner

Primary Examiner—Edward F. Urban
Assistant Examiner—Marceau Milord
(74) Attorney, Agent, or Firm—Brinks Hofer Gilson & Lione

(57) ABSTRACT

A protocol feature communication method and system is disclosed. The method defines a bit stream identifying each feature of a protocol version. Each bit of the bit stream is set in either a first logic state indicating support of the corresponding protocol feature or a second logic state indicating an absence of a support of the corresponding protocol feature. The bit stream is stored within a mobile station. The system comprises the mobile station and base station. The mobile station is operable to transmit the bit stream to the base station and the base station is operable to determine each protocol feature supported by the mobile station by identifying each bit of the bit stream that is set in the first logic state.

24 Claims, 2 Drawing Sheets

METHOD AND SYSTEM FOR PROTOCOL FEATURE COMMUNICATION

FIELD OF THE INVENTION

The present invention relates to telecommunication networks and, more particularly, to a method and system for communicating protocol features supported by a mobile station and a base station message center inter-working.

BACKGROUND OF THE INVENTION

Under the most current revision of a TIA/EIA-136 telecommunication standard, there are five protocols for identifying features that may be supported, mandatorily or optionally, by a mobile station and a base station message center inter-working (hereinafter "BMI"). A first protocol version TIA/EIA-136-A PV1 (hereinafter "PV1") including three mandatory features and twenty-five optional features is illustrated in the following TABLE 1:

TABLE 1

| PV1 FEATURES | OPTIONAL/MANDATORY |
| --- | --- |
| Intelligent Roaming | Optional |
| Multilingual Display | Optional |
| ISO-8859 (Latin 1) | Mandatory |
| ISO-10646 (BMP) | Optional |
| ISO-8859-8 (Latin/Hebrew) | Optional |
| Asyno Data | Optional |
| G3-Fax | Optional |
| DADS | Optional |
| Non-Public Mode | Optional |
| DTX | Optional |
| Subaddressing | Optional |
| User Group | Optional |
| Half-Rate DTC | Optional |
| Double-Rate DTC | Optional |
| Triple-Rate DTC | Optional |
| STU-III | Optional |
| Total Charge Info | Optional |
| TSAR | Mandatory |
| Cellular Messaging Teleservice | Optional |
| GUTS | Optional |
| OATS | Optional |
| OPTS | Optional |
| SMS Submit | Optional |
| R-Data Delivery on DTC | Mandatory |
| PFC 2 to 8 | Optional |
| ACELP | Optional |
| OMEA and VPM | Optional |

A second protocol version TIA/EIA-136-A PV2 (hereinafter "PV2") includes one mandatory feature and two optional features in addition to the three mandatory features and twenty-five optional features of PV1. The specific mandatory feature and optional features of PV2 are illustrated in the following TABLE 2:

TABLE 2

| PV2 FEATURES | OPTIONAL/MANDATORY |
| --- | --- |
| Downlink Power Control | Mandatory |
| Enhanced MACA | Optional |
| BATS | Optional |

A third protocol version TIA/EIA-136-A PV3 (hereinafter "PV3") includes zero mandatory features and five optional features in addition to the four mandatory features and twenty-seven optional features of PV1 and PV2. The specific optional features of PV3 are illustrated in the following TABLE 3:

TABLE 3

| PV3 FEATURES | OPTIONAL/MANDATORY |
| --- | --- |
| 136+ Packet Data | Optional |
| 8-PSk Modulation | Optional |
| Extended Voice Mode | Optional |
| USI Vocoder | Optional |
| Interleaving | Optional |

A fourth protocol version TIA/EIA-136-B PV4 (hereinafter "PV4") includes two mandatory features and three optional features in addition to the four mandatory features and thirty-two optional features of PV1, PV2 and PV3. The specific mandatory features and optional features of PV4 are illustrated in the following TABLE 4:

TABLE 4

| PV4 FEATURES | OPTIONAL/MANDATORY |
| --- | --- |
| Enhanced Privacy and Encryption | Mandatory |
| Added Diversity For Improvement in Channel Errors | Optional |
| GPRS-136 | Optional |
| +Code Dialing | Mandatory |
| Charge Indication Teleservice (CIT) | Optional |

A fifth protocol version TIA/EIA-136-C PV5 (hereinafter "PV5") includes zero mandatory features and nine optional features in addition to the six mandatory features and thirty-five optional features of PV1, PV2, PV3 and PV4. The specific optional features of PV5 are illustrated in the following TABLE 5:

TABLE 5

| PV5 FEATURES | OPTIONAL/MANDATORY |
| --- | --- |
| Removable User Identity Module (R-UIM) | Optional |
| EGPRS-136 | Optional |
| Adaptive Multi-Rate (AMR) | Optional |
| Fast Power Control | Optional |
| Teleservice Over GSM SMS | Optional |
| Transmit Diversity On DTC | Optional |
| High Penetration Paging (HPP) | Optional |
| System Assisted Mobile Positioning Through Satellite | Optional |

Currently, there are two mechanisms employed by telecommunication networks for communicating which mandatory features of PV1–PV5 are supported by a mobile station and a BMI. The first mechanism involves the mobile station and the BMI agreeing, during an initial registration process, on the lowest common denominator of features between PV1–PV5 that is being supported by the mobile station and the BMI. Thus, the mobile station and the BMI are able to identify the mandatory features being supported by the mobile station and the BMI. The second mechanism involves including a list of supported mandatory features within a Capability Request message and a Capability Report message.

Although the two mechanisms have utility, a limitation of the two mechanisms is the failure to communicate optional features of PV1–PV5 that are supported by the mobile station and the BMI. As such, in order to determine if a particular optional feature is supported, for example the teleservice feature of PV5, the BMI currently sends an R-DATA message corresponding to an optional feature to the mobile station and a reception of a R-DATA REJECT message from the mobile station indicates to the BMI that the mobile station is not supporting the optional feature. However, this method can be a signaling drain.

Another limitation under the current TIA/EIA-136 is a restriction of having to implement all mandatory features from a selected protocol version and each preceding protocol version. For example, a manufacturer of a mobile station having PV5 must also implement the mandatory features of PV1–PV4. However, mandatory features of PV1–PV4 may not be commercially demanded by consumers or required by the carrier of the mobile station. Thus, the restriction has an impact on the development costs and schedules of mobile stations, which in turn affects the deployment of related mobile services.

Accordingly, there is a need for an improved method and system for communicating supported mandatory and optional features under the TIA/EIA -136 standard and similar types of standards.

DETAILED DESCRIPTION OF THE PRESENTLY PREFERRED EMBODIMENT(S)

Figure 1:
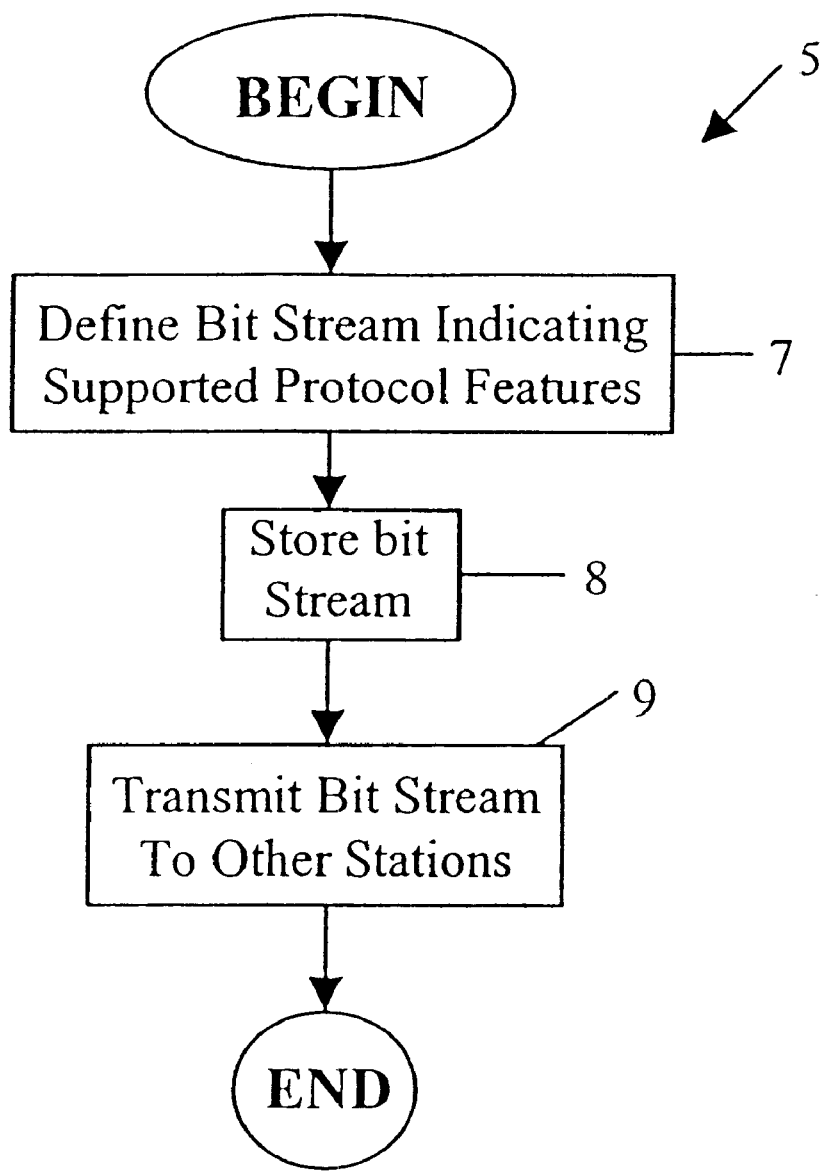
FIG. 1 is a flow chart of a method of communicating supported protocol features in accordance with an embodiment of the invention.

It is an advantage of the present invention to provide an improved method and system for establishing which protocol features are mutually supported by communicating telecommunication stations.

One form of the present invention is a method for communicating a set of one or more protocol features supported by a telecommunication station. First, a bit stream is defined. Each bit of the bit stream represents a separate distinct feature supported by a protocol. Second, each bit of the bit stream is set in either a first logic state or a second logic state. The first logic state indicates a support of a corresponding distinct feature by the telecommunication station, and the second logic state indicates an absence of support of the corresponding distinct feature by the telecommunication station. Finally, the bit stream is stored within the telecommunication station.

A second form of the present invention is a computer program product in a computer-useable medium for communicating a set of one or more protocol features supported by a first telecommunication station to a second telecommunication station. The computer program product comprises program code for storing a bit stream, where each bit of the bit stream represents a separate distinct feature supported by a protocol. Each bit of the bit stream is set in either a first logic state or a second logic state. The first logic state indicates support of a corresponding distinct feature by the telecommunication station, and the second logic state indicates an absence of support of the corresponding distinct feature by the telecommunication station. The computer program product further comprises program code for transmitting the bit stream to the second telecommunication station.

A third form of the present invention is a method communicating a set of one or more protocol features supported by a first telecommunication station to a second telecommunication station. First, the first telecommunication station transmits a bit stream to the second telecommunication station, where each bit of the bit stream represents a separate distinct feature provided by a protocol. Each bit of the bit stream is set in either a first logic state or a second logic state. The first logic state indicates a support of a corresponding distinct feature by the first telecommunication station, and the second logic state indicates an absence of support of the corresponding distinct feature by the first telecommunication station. The second telecommunication station identifies each bit of the first bit stream that is set in the first logic state to determine each protocol feature of the first protocol supported by the first telecommunication station.

A fourth form of the present invention is a telecommunication network, comprising at least a pair of telecommunication stations. A first telecommunication station is operable to transmit a bit stream, where each bit of the bit stream represents a separate distinct feature provided by a protocol. Each bit of the bit stream is set in either a first logic state or a second logic state. The first logic state indicates a support of a corresponding distinct feature by the telecommunication station, and the second logic state indicates an absence of support of the corresponding distinct feature by the telecommunication station. The second telecommunication station is operable to identify each bit of the bit stream being set in the first logic state to determine each protocol feature supported by the first telecommunication station.

The foregoing forms and other forms, features and advantages of the invention will become further apparent from the following description of the presently preferred embodiments, read in conjunction with the accompanying drawings. The following description and drawings are merely illustrative of the invention rather than limiting, the scope of the invention being defined by the appended claims and equivalents thereof.

Turning now to the drawings, and in particular to FIG. 1, there is shown a flow chart 5 of an exemplary method of communicating supported protocol features.

A protocol communication method of the present invention includes defining a bit stream for each PV1–PV5 with each bit of a bit stream representing a separate distinct protocol feature (step 7). Additionally, each bit is set to either a logic "0" state for indicating an absence of support of the corresponding feature by a telecommunication station, e.g. a mobile station or a BMI, or a logic "1" state for indicating a support of the corresponding feature by a telecommunication station. The bit stream can be based on bit maps corresponding to the protocol versions, as will be described in further detail below.

Next, in step 8, bit stream is stored locally in the telecommunication station. The stored bit stream can be transferred to other stations to communicate which protocol features are supported by the telecommunication station (step 9).

An exemplary bit map for PV1 is shown in the following TABLE 6:

TABLE 6

| PV1 FEATURES | SUPPORT BIT POSITION OF BS₃ |
|---|---|
| Intelligent Roaming | xxxx xxxx xxxx xxxx xxxx xxxx xxxx xxx1 |
| Multilingual Display | xxxx xxxx xxxx xxxx xxxx xxxx xxxx xx1x |
| ISO-8859 (Latin 1) | xxxx xxxx xxxx xxxx xxxx xxxx xxxx x1xx |
| ISO-10646 (BMP) | xxxx xxxx xxxx xxxx xxxx xxxx xxxx 1xxx |
| ISO-8859-8 (Latin/Hebrew) | xxxx xxxx xxxx xxxx xxxx xxxx xxx1 xxxx |
| Asyno Data | xxxx xxxx xxxx xxxx xxxx xxxx xx1x xxxx |
| G3-Fax | xxxx xxxx xxxx xxxx xxxx xxxx x1xx xxxx |
| DADS | xxxx xxxx xxxx xxxx xxxx xxxx 1xxx xxxx |
| Non-Public Mode | xxxx xxxx xxxx xxxx xxxx xxx1 xxxx xxxx |
| DTX | xxxx xxxx xxxx xxxx xxxx xx1x xxxx xxxx |
| Subaddressing | xxxx xxxx xxxx xxxx xxxx x1xx xxxx xxxx |
| User Group | xxxx xxxx xxxx xxxx xxxx 1xxx xxxx xxxx |
| Half-Rate DTC | xxxx xxxx xxxx xxxx xxx1 xxxx xxxx xxxx |
| Double-Rate DTC | xxxx xxxx xxxx xxxx xx1x xxxx xxxx xxxx |
| Triple-Rate DTC | xxxx xxxx xxxx xxxx x1xx xxxx xxxx xxxx |
| STU-III | xxxx xxxx xxxx xxxx 1xxx xxxx xxxx xxxx |
| Total Charge Info | xxxx xxxx xxxx xxx1 xxxx xxxx xxxx xxxx |
| TSAR | xxxx xxxx xxxx xx1x xxxx xxxx xxxx xxxx |
| Cellular Messaging Teleservice | xxxx xxxx xxxx x1xx xxxx xxxx xxxx xxxx |
| GUTS | xxxx xxxx xxxx 1xxx xxxx xxxx xxxx xxxx |
| OATS | xxxx xxxx xxx1 xxxx xxxx xxxx xxxx xxxx |
| OPTS | xxxx xxxx xx1x xxxx xxxx xxxx xxxx xxxx |
| SMS Submit | xxxx xxxx x1xx xxxx xxxx xxxx xxxx xxxx |
| R-Data Delivery on DTC | xxxx xxxx 1xxx xxxx xxxx xxxx xxxx xxxx |
| PFC 2 to 8 | xxxx xxx1 xxxx xxxx xxxx xxxx xxxx xxxx |
| ACELP | xxxx xx1x xxxx xxxx xxxx xxxx xxxx xxxx |
| OMEA and VPM | xxxx x1xx xxxx xxxx xxxx xxxx xxxx xxxx |

Referring to TABLE 6, a bit stream (hereinafter "$BS_3$") having thirty-two bits is defined for PV1. The least significant twenty-seven bit positions of $BS_3$ are representative of twenty-seven protocol features of PV1 with the most significant five bit positions being reserved. TABLE 6 illustrates a bit position indicating a support by a telecommunication station of a corresponding separate and distinct protocol feature of PV1. The $BS_3$ being xxxx x000 0000 0000 0000 0000 0000 0000 indicates that none of the features of PV1 are being supported by a telecommunication station.

An exemplary bit map for PV2 is shown in the following TABLE 7:

TABLE 7

| PV2 FEATURES | SUPPORT BIT POSITION OF BS₄ |
|---|---|
| Downlink Power Control | xxxx xxx1 |
| Enhanced MACA | xxxx xx1x |
| BATS | xxxx x1xx |

Referring to TABLE 7, a bit stream (hereinafter "$BS_4$") having eight bits is defined for PV2. The least significant three bit positions of $BS_4$ are representative of three protocol features of PV2 with the most significant five bit positions being reserved. TABLE 7 illustrates a bit position indicating a support by a telecommunication station of a corresponding separate and distinct protocol feature of PV2. The $BS_4$ being xxxx x000 indicates that none of the features of PV2 are being supported by a telecommunication station.

An exemplary bit map for PV3 is shown in the following TABLE 8:

TABLE 8

| PV3 FEATURES | SUPPORT BIT POSITION OF BS₅ |
|---|---|
| 136+ Packet Data | xxxx xxx1 |
| 8-PSK Modulation | xxxx xx1x |
| Extended Voice Mode | xxxx x1xx |
| USI Vocoder | xxxx 1xxx |
| Interleaving | xxx1 xxxx |

Referring to TABLE 8, a bit stream (hereinafter "$BS_5$") having eight bits is defined for PV3. The least significant five bit positions of $BS_5$ are representative of five protocol features of PV3 with the most significant three bit positions being reserved. TABLE 8 illustrates a bit position indicating a support by a telecommunication station of a corresponding separate and distinct protocol feature of PV3. The $BS_5$ being xxx0 0000 indicates that none of the features of PV3 are being supported by a telecommunication station.

An exemplary bit map for PV4 is shown in the following TABLE 9:

TABLE 9

| PV4 FEATURES | SUPPORT BIT POSITION OF BS₆ |
|---|---|
| Enhanced Privacy and Encryption | xxxx xxx1 |
| Added Diversity For Improvement in Channel Errors | xxxx xx1x |
| GPRS-136 | xxxx x1xx |
| +Code Dialing | xxxx 1xxx |
| Charge Indication Teleservice (CIT) | xxx1 xxxx |

Referring to TABLE 9, a bit stream (hereinafter "$BS_6$") having eight bits is defined for PV4. The least significant five bit positions of $BS_6$ are representative of five protocol features of PV4 with the most significant three bit positions being reserved. TABLE 9 illustrates a bit position indicating a support by a telecommunication station of a corresponding separate and distinct protocol feature of PV4. The $BS_6$ being xxx0 0000 indicates that none of the features of PV4 are being supported by a telecommunication station.

An exemplary bit map for PV5 is shown in the following TABLE 10:

TABLE 10

| PV5 FEATURES | SUPPORT BIT POSITION OF $BS_7$ |
|---|---|
| Removable User Identity Module (R-UIM) | Xxxx xxxx xxx1 |
| EGPRS-136 | Xxxx xxxx xx1x |
| Adaptive Multi-Rate (AMR) | Xxxx xxxx x1xx |
| Fast Power Control | Xxxx xxxx 1xxx |
| Teleservice Over GSM SMS | Xxxx xxx1 xxxx |
| Transmit Diversity On DTC | Xxxx xx1x xxxx |
| High Penetration Paging (HPP) | Xxxx x1xx xxxx |
| System Assisted Mobile Positioning Through Satellite | Xxxx 1xxx xxxx |

Referring to TABLE 10, a bit stream (hereinafter "$BS_7$") having twelve bits is defined for PV5. The least significant eight bit positions of $BS_7$ are representative of eight protocol features of PV4 with the most significant four bit positions being reserved. TABLE 10 illustrates a bit position indicating a support by a telecommunication station of a corresponding separate and distinct protocol feature of PV5. The $BS_7$ being xxxx 0000 0000 indicates that none of the features of PV5 are being supported by a telecommunication station.

An exemplary bit map for frequency bands is shown in the following TABLE 11:

TABLE 11

| FREQUENCY BAND | SUPPORT BIT POSITION OF $BS_8$ |
|---|---|
| 800 MHz a & b Bands | xxxx xxx1 |
| 1900 MHz Bands | xxxx xx1x |
| 799 MHz c & d Bands | xxxx x1xx |
| 2 GHz IMT-2000 Band | xxxx 1xxx |

Referring to TABLE 11, a bit stream (hereinafter "$BS_8$") having eight bits is defined for the frequency bands. The least significant four bit positions of $BS_8$ are representative of four frequency bands with the most significant four bit positions being reserved. TABLE 11 illustrates a bit position indicating a support by a telecommunication station of a corresponding separate and distinct frequency band. The $BS_8$ being xxxx 0000 indicates that none of the frequency bands are being supported by a telecommunication station.

An exemplary bit map for additional telecommunication features is shown in the following TABLE 12:

TABLE 12

| ADDITIONAL FEATURES | SUPPORT BIT POSITION OF $BS_9$ |
|---|---|
| Analog | xxxx xxx1 |
| GHOST | xxxx xx1x |
| TTY | xxxx x1xx |
| WAP | xxxx 1xxx |

Referring to TABLE 12, a bit stream (hereinafter "$BS_9$") having eight bits is defined for additional telecommunication features. The least significant four bit positions of $BS_8$ are representative of four additional features with the most significant four bit positions being reserved. TABLE 12 illustrates a bit position indicating a support by a telecom-munication station of a corresponding separate and distinct telecommunication feature. The $BS_9$ being xxxx 0000 indicates that none of the additional features are being supported by a telecommunication station.

Figure 2:
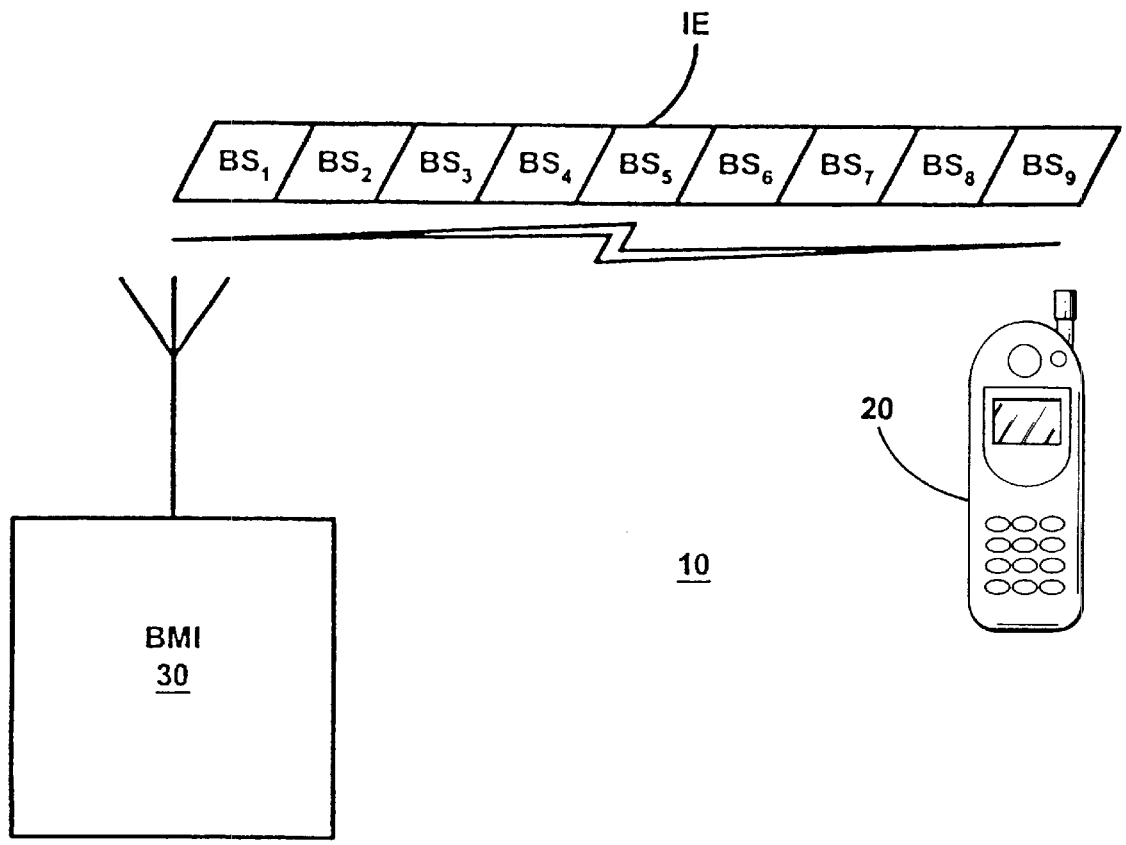
FIG. 2 is a diagram of a telecommunication network communicating an information element, in accordance with another embodiment of the present invention.

Referring to FIG. 2, a telecommunication network 10 comprising a mobile station 20 and a BMI 30 is shown. Alternative embodiments of network 10 can include two or more mobile stations 20 and/or two or more BMIs 30. Mobile station 20 stores an information element IE. One embodiment of information element IE is shown in the following TABLE 13:

TABLE 13

| ELEMENT | BIT STREAM | TOTAL BITS |
|---|---|---|
| Protocol Discriminator | $BS_1$ | 2 |
| Message Type | $BS_2$ | 6 |
| PV1 | $BS_3$ | 32 |
| PV2 | $BS_4$ | 8 |
| PV3 | $BS_5$ | 8 |
| PV4 | $BS_6$ | 8 |
| PV5 | $BS_7$ | 12 |
| Frequency Bands | $BS_8$ | 8 |
| Additional Features | $BS_9$ | 12 |

Referring to TABLE 13, protocol discriminator and message type are conventional bit stream elements.

Mobile station 20 transmits information element IE in a data string format to BMI 30 as shown immediately after a Power-Up registration, a New System registration, a Forced registration, an ACC to DCCH registration, or a similar type of registration. BMI 30 receives information element IE and identifies each bit of bit streams $BS_1$–$BS_9$ being set to a logic "1" state. Consequently, BMI 30 is able to determine which features of PV1–PV5 as well as which frequency bands and additional telecommunication features are supported by mobile station 20. The BMI 30 can then configure its operations accordingly to communicate with the mobile station 20 using the supported features.

In other embodiments, BMI 30 can set a flag in an Audit Confirmation message that corresponds to information element IE and mobile station 20 can transmit information element to BMI 30 in response to the Audit Confirmation message. Also, in other embodiments, information element IE can be partitioned into single elements or subgroups of elements which can be separately transmitted to BMI 30. In yet other embodiments, BMI 30 can store information element IE therein and transmit information element TE to mobile station 20 as described herein.

I claim:

1. A method for establishing communication of at least one protocol feature supported by a telecommunication station, the method comprising:

defining a first bit stream having a plurality of bits, each bit of the first bit stream corresponding to a different feature of a first protocol;

setting each bit of the first bit stream to a first logic state or a second logic state, the first logic state being indicative of support of the corresponding feature by the telecommunication station, the second logic state being indicative of an absence of support of the corresponding feature by the telecommunication station; and storing the first bit stream within the telecommunication station.

2. The method of claim 1, further comprising:

defining a second bit stream having a plurality of bits, each bit of the second bit stream corresponding to a feature of a second protocol;

setting each bit of the second bit stream to the first logic state or the second logic state; and storing the second bit stream within the telecommunication station.

3. The method of claim 2, further comprising:

defining a third bit stream having a plurality of bits, each bit of the third bit stream corresponding to a feature of a third protocol;

setting each bit of the third bit stream to the first logic state or the second logic state; and storing the third bit stream within the telecommunication station.

4. The method of claim 3, further comprising:

defining a fourth bit stream having a plurality of bits, each bit of the fourth bit stream corresponding to a feature of a fourth protocol;

setting each bit of the fourth bit stream to the first logic state or the second logic state; and storing the fourth bit stream within the telecommunication station.

5. The method of claim 4, further comprising:

defining a fifth bit stream having a plurality of bits, each bit of the fifth bit stream corresponding to a distinct feature of a fifth protocol;

setting each bit of the fifth bit stream to the first logic state or the second logic state, and storing the fifth bit stream within the telecommunication station.

6. The method of claim 1, further comprising:

defining a second bit stream having a plurality of bits, each bit of the second bit stream corresponding to a frequency band;

setting each bit of the second bit stream to the first logic state or the second logic state; and storing the second bit stream within the telecommunication station.

7. A computer-useable medium storing a computer program product for communicating a set of one or more protocol features supported by a first telecommunication station to a second telecommunication station, the computer program product comprising:

a program code for storing a first bit stream of a plurality of bits, each bit of the first bit stream representing a different feature of a first protocol, wherein each bit of the first bit stream is set in either a first logic state or a second logic state, the first logic state being indicative of a support of the corresponding feature by the first telecommunication station, the second logic state being indicative of an absence of the support of the corresponding feature by the first telecommunication station; and a program code for transmitting the first bit stream to the second telecommunication station.

8. The computer-usable medium of claim 7, further comprising:

a program code for storing a second bit stream of a plurality of bits, each bit of the second bit stream representing a feature of a second protocol, each bit of the second bit stream being set in either the first logic state or the second logic state; and a program code for transmitting the first bit stream and the second bit stream to the second telecommunication station.

9. The computer-usable medium of claim 8, further comprising:

a program code for storing a third bit stream of a plurality of bits, each bit of the third bit stream representing a feature of a third protocol, each bit of the third bit stream being set in either the first logic state or the second logic state; and a program code for transmitting the first bit stream, the second bit stream, and the third bit stream to the second telecommunication station.

10. The computer-usable medium of claim 9, further comprising:

a program code for storing a fourth bit stream of a plurality of bits, each bit of the fourth bit stream representing a feature of a fourth protocol, each bit of the fourth bit stream being set in either the first logic state or the second logic state; and a program code for transmitting the first bit stream, the second bit stream, the third bit stream, and the fourth bit stream to the second telecommunication station.

11. The computer-usable medium of claim 10, further comprising:

a program code for storing a fifth bit stream of a plurality of bits, each bit of the fifth bit stream representing a feature of a fifth protocol, each bit of the fifth bit stream being set in either the first logic state or the second logic state; and a program code for transmitting the first bit stream, the second bit stream, the third bit stream, the fourth bit stream, and the fifth bit stream to the second telecommunication station.

12. The computer-usable medium of claim 11, further comprising:

a program code for storing a second bit stream of a plurality of bits, each bit of the second bit stream representing a frequency band, each bit of the second bit stream being set in either the first logic state or the second logic state; and a program code for transmitting the first bit stream and the second bit stream to the second telecommunication station.

13. A method for communicating a set of one or more protocol features supported by a first telecommunication station to a second telecommunication station, the method comprising:

operating the first telecommunication station to transmit a first bit stream of a plurality of bits to the second telecommunication station, each bit of the first bit stream corresponding to a different feature of a first protocol, wherein each bit of the first bit stream is set in either a first logic state or a second logic state, first logic state being indicative of a support of the corresponding feature by the first telecommunication station, the second logic state being indicative of an absence of the support of the corresponding feature by the first telecommunication station; and operating the second telecommunication station to identify each bit of the first bit stream being set in the first logic state to thereby determine each protocol feature of the first protocol supported by the first telecommunication station.

14. The method of claim 13, further comprising:

operating the first telecommunication station to transmit a second bit stream of a plurality of bits to a second telecommunication station, each bit of the second bit stream representing a feature of a second protocol, each bit of the second bit stream being set in either the first logic state or the second logic state; and operating the second telecommunication station to identify each bit of the second bit stream being set in the first logic state to determine each protocol feature of the second protocol supported by the first telecommunication station.

15. The method of claim 14, further comprising:

operating the first telecommunication station to transmit a third bit stream of a plurality of bits to a second telecommunication station, each bit of the third bit stream representing a separate distinct feature of a third protocol, each bit of the third bit stream being set in either the first logic state or the second logic state; and operating the second telecommunication station to identify each bit of the third bit stream being set in the first logic state to determine each protocol feature of the third protocol supported by the first telecommunication station.

16. The method of claim 15, further comprising:

operating the first telecommunication station to transmit a fourth bit stream of a plurality of bits to a second telecommunication station, each bit of the fourth bit stream representing a feature of a fourth protocol, each bit of the fourth bit stream being set in either the first logic state or the second logic state; and operating the second telecommunication station to identify each bit of the fourth bit stream being set in the first logic state to determine each protocol feature of the fourth protocol supported by the first telecommunication station.

17. The method of claim 16, further comprising:

operating the first telecommunication station to transmit a fifth bit stream of a plurality of bits to a second telecommunication station, each bit of the fifth bit stream representing a feature of a fifth protocol, each bit of the fifth bit stream being set in either the first logic state or the second logic state; and operating the second telecommunication station to identify each bit of the fifth bit stream being set in the first logic state to determine each protocol feature of the fifth protocol supported by the first telecommunication station.

18. The method of claim 13, further comprising:

operating the first telecommunication station to transmit a second bit stream of a plurality of bits to the second telecommunication station, each bit of the first bit stream representing a frequency band, each bit of the second bit stream is set in either the first logic state or the second logic state; and operating the second telecommunication station to identify each bit of the second bit stream being set in the first logic state to determine each frequency band supported the first telecommunication station.

19. A telecommunication network, comprising:

a first telecommunication station operable to transmit a first bit stream of a plurality of bits, each bit of the first bit stream representing a different feature of a first protocol, wherein each bit of the first bit stream is set in either a first logic state or a second logic state, the first logic state being indicative of a support of the corresponding feature by the first telecommunication station, the second logic state being indicative of an absence of the support of the corresponding feature by the first telecommunication station; and a second telecommunication station operable to identify each bit of the first bit stream being set in the first logic state to determine each protocol feature of the first protocol supported by the first telecommunication station.

20. The telecommunication network of claim 19, wherein the first telecommunication station is further operable to transmit a second bit stream of a plurality of bits, each bit of the second bit stream representing a feature of a second protocol, each bit of the second bit stream is set in either a first logic state or a second logic state; and the second telecommunication station is further operable to identify each bit of the first bit stream being set in the first logic state to determine each feature of the second protocol supported by the first telecommunication station.

21. The telecommunication network of claim 20, wherein the first telecommunication station is further operable to transmit a third bit stream of a plurality of bits, each bit of the third bit stream representing a feature of a third protocol, each bit of the third bit stream is set in either a first logic state or a second logic state; and the second telecommunication station is further operable to identify each bit of the third bit stream being set in the first logic state to determine each protocol feature of the third protocol supported by the first telecommunication station.

22. The telecommunication network of claim 21, wherein the first telecommunication station is further operable to transmit a fourth bit stream of a plurality of bits, each bit of the fourth bit stream representing a feature of a fourth protocol, each bit of the fourth bit stream is set in either a first logic state or a second logic state; and the second telecommunication station is further operable to identify each bit of the fourth bit stream being set in the first logic state to determine each protocol feature of the fourth protocol supported by the first telecommunication station.

23. The telecommunication network of claim 22, wherein the first telecommunication station is further operable to transmit a fifth bit stream of a plurality of bits, each bit of the fifth bit stream representing a separate distinct feature of a fifth protocol, each bit of the fifth bit stream is set in either a first logic state or a second logic state; and the second telecommunication station is further operable to identify each bit of the fifth bit stream being set in the first logic state to determine each protocol feature of the fifth protocol supported by the first telecommunication station.

24. The telecommunication network of claim 19, wherein the first telecommunication station is further operable to transmit a second bit stream of a plurality of bits, each bit of the second bit stream representing a feature frequency band, each bit of the fifth bit stream is set in either a first logic state or a second logic state; and the second telecommunication station is further operable to identify each bit of the second bit stream being set in the third logic state to determine frequency band supported by the first telecommunication station.

* * * * *

UNITED STATES PATENT AND TRADEMARK OFFICE
CERTIFICATE OF CORRECTION

PATENT NO. : 6,597,921 B2
DATED : July 22, 2003
INVENTOR(S) : Balasubramaniam K. Thandu It is certified that error appears in the above-identified patent and that said Letters Patent is hereby corrected as shown below:

<u>Title page,</u>
Item [56], References Cited, U.S. PATENT DOCUMENTS, insert:
-- 5,297,192     03/1994      Gerszberg --.

Signed and Sealed this

Sixth Day of July, 2004

JON W. DUDAS
*Acting Director of the United States Patent and Trademark Office*